United States Patent [19]

McKinney et al.

[11] Patent Number: 4,912,301
[45] Date of Patent: Mar. 27, 1990

[54] APPARATUS AND METHOD FOR THE PRODUCTION OF OXIDES OF LEAD

[75] Inventors: B. F. McKinney; Earl E. Busdieker, both of Indianapolis; Kenneth Maurer, Brazil, all of Ind.

[73] Assignee: Oxide & Chemical Corporation, Indianapolis, Ind.

[21] Appl. No.: 258,809

[22] Filed: Oct. 17, 1988

[51] Int. Cl.$^4$ ............ F27B 9/18; F27D 3/08
[52] U.S. Cl. ..................... 219/388; 34/183
[58] Field of Search ............ 219/388, 389; 34/166, 34/179, 180, 183; 432/98, 139, 154

[56] References Cited

U.S. PATENT DOCUMENTS

| | | | |
|---|---|---|---|
| 288,553 | 11/1883 | Davies | 34/166 |
| 1,595,088 | 8/1926 | Gudger | 34/166 |
| 1,680,087 | 8/1928 | Conroy | 34/166 |
| 1,957,347 | 5/1934 | McKinnon | 432/154 |
| 2,452,249 | 10/1948 | Leiske | 34/183 |
| 3,909,958 | 10/1975 | Castanoli | 34/180 |

FOREIGN PATENT DOCUMENTS

| | | | |
|---|---|---|---|
| 58-117954 | 7/1983 | Japan | 34/183 |
| 22656 | 10/1982 | United Kingdom | 34/166 |

Primary Examiner—Teresa J. Walberg
Attorney, Agent, or Firm—Woodard, Emhardt, Naughton, Moriarty & McNett

[57] ABSTRACT

A furnace for producing oxides of lead includes an enclosure defining a furnace chamber, a feed inlet for feeding particulate lead into the chamber, and a discharge outlet for discharging the particulate lead outside the chamber. An array of horizontally disposed serially communicating tubes are arranged vertically within the chamber, communicating between the feed inlet and the discharge outlet. A rotating valve is associated with the feed inlet, for continuously feeding particulate lead into the number of tubes. Variable drive chain and sprocket combinations are associated with each of the tubes to convey the particulate lead serially along the tubes. The furnace includes electric heat tapes surrounding the tubes, for heating the particulate lead within the tubes while the lead is being conveyed along the tubes. The furnace can be used to produce red lead from leady-oxide or litharge by first supplying air or pure oxygen into the tubes. Leady-oxide is supplied at feed inlet and heated in the first tube to 1250° F. to initiate the exothermic conversion of leady-oxide to litharge. Heat from the exothermic reaction occurring in the remaining tubes of the array is used to pre-heat the first tube. Litharge formed from the exothermic reaction is exposed to a lower temperature of 850° in the lowermost tubes of the array for formation of red lead. The travel rate of the litharge determines the percentage of red lead in the final product exiting the discharge outlet.

20 Claims, 3 Drawing Sheets

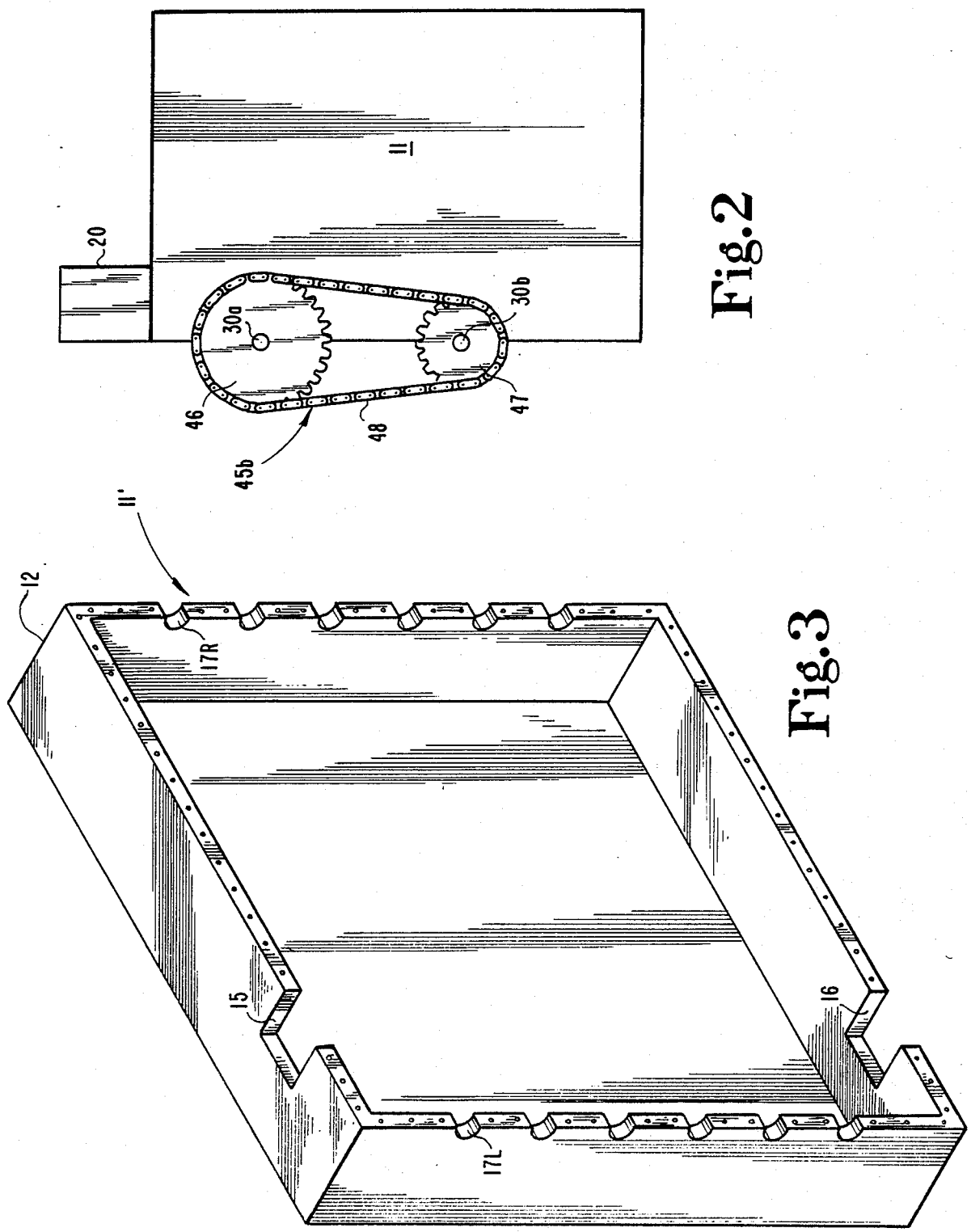

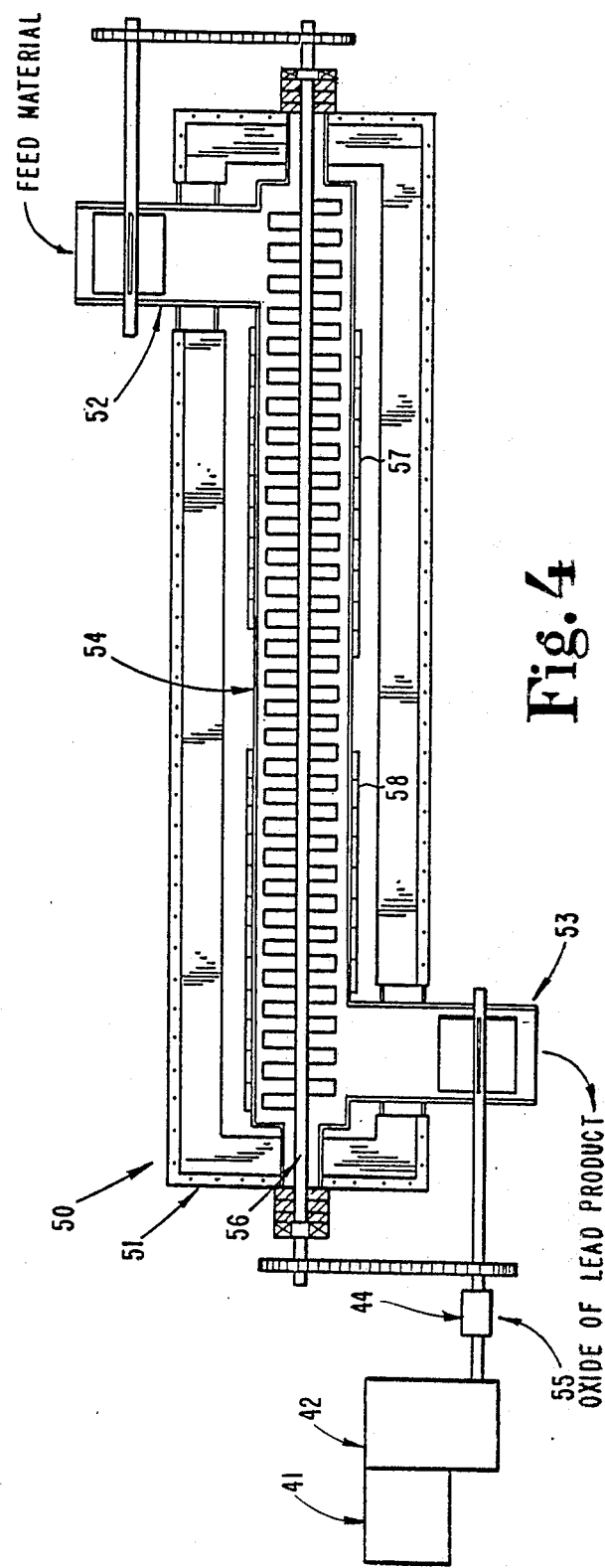

APPARATUS AND METHOD FOR THE PRODUCTION OF OXIDES OF LEAD

BACKGROUND OF THE INVENTION

The present invention relates generally to the field of the production of oxides of lead, such as litharge and red lead. In particular, the present invention concerns an apparatus and method adapted for the continuous production of these oxides of lead.

Litharge (lead monoxide) is supplied in industrial quantities for use in the pigment industry and in the leaded glass industry. Litharge is produced by oxidation of particulate lead into lead monoxide. Presently, there are two methods employed in the production of litharge. The first method uses a rake furnace to oxidize lead in a batch or continuous process. The second method is a continuous production process which employs a horizontal drying kiln in which lead is tumbled while being oxidized.

Red lead production is typically in a batch process using a rake furnace, for instance. Typically, litharge is maintained in an atmosphere containing oxygen within the furnace for a sufficient amount of time necessary to convert the litharge to red lead.

A typical furnace used in the production of litharge and red lead includes a fossil fuel burner to raise the temperature of the particulate material to the desired reaction temperature. In the furnaces of the prior art, the atmosphere inside the furnace is continuously evacuated into a bag house, which filters out the particulate lead contained therein for environmental reasons.

SUMMARY OF THE INVENTION

One embodiment of the present invention is an apparatus for producing oxides of lead which is characterized by a furnace having an enclosure defining a furnace chamber, a feed inlet for feeding particulate lead into the chamber, and a discharge outlet for discharging the particulate lead outside the chamber. A plurality of tubes are horizontally disposed within the chamber communicating between the feed inlet and the discharge outlet. A rotating valve is associated with the feed inlet, for continuously feeding particulate lead into the plurality of tubes. A conveyor assembly is associated with the plurality of tubes for conveying the particulate lead along the tubes from the feed inlet to the discharge outlet. The furnace includes an electric heating device, associated with the plurality of tubes, for heating the particulate lead within the tubes while the particulate lead is being conveyed along the tubes.

The furnace can be used to produce various oxides of lead by supplying a as including an oxidizing agent into the plurality of tubes. A particulate mixture including particulate lead is fed into the tubes through the rotary valve at the feed inlet. The tubes are heated to a temperature sufficient to convert the particulate mixture to the desired oxide of lead. The particulate mixture is conveyed along the tubes toward the discharge outlet at a rate sufficient to produce the desired proportion of the oxide of lead in the end product, which is then discharged at the discharge outlet.

With the limitations of the prior art systems in mind, it is an obJect of the present invention to provide a furnace for red lead or oxide of lead production that minimizes the energy required to heat the feed material, reduces the amount of oxygen required to insure full reaction of the feed material, and reduces the amount of particulate material that must be processed in the bag house. It is a further object to provide a system or apparatus capable of accepting a variety of particulate feed materials and producing a variety of oxides of lead in a continuous, controllable process. These and other objects of the present invention will b shown by reference to the following description and accompanying figures.

BRIEF DESCRIPTION OF THE DRAWINGS

FIG. 2 is a partial end view of the furnace of FIG. 1, taken along line 2—2 as viewed in the direction of the arrows.

FIG. 3 is a side elevational view of one half of the furnace enclosure.

FIG. 4 is an alternative embodiment of the furnace of the present invention including a single tube.

DESCRIPTION OF THE PREFERRED EMBODIMENT

Figure 1:
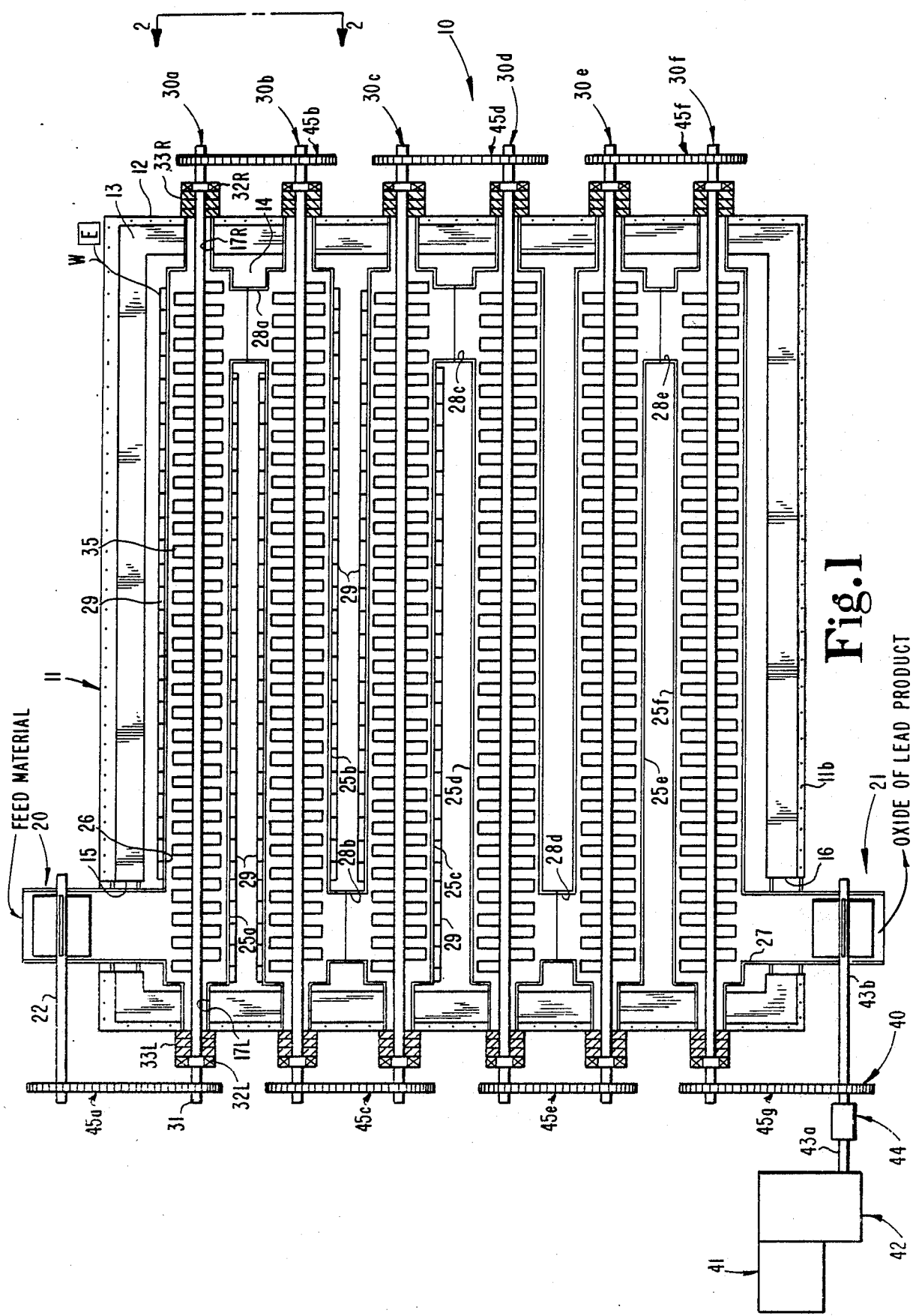
FIG. 1 is a side cutaway view of the furnace of the present invention for the production of oxides of lead.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relate.

The apparatus of the present invention for production of red lead and other oxides of lead includes a furnace 10, as illustrated in FIG. 1. The furnace 10 includes an enclosure 11 which, in the preferred embodiment, consists of a box 12 lined on its interior surface with a lining 13. The enclosure 11 defines a furnace chamber 14. The lining 13 may be an insulating material or a refractory material of a conventionally known type, such as ceramic. The enclosure 11 includes an upper wall 11a which defines a feed inlet 15 therethrough. Similarly, a lower wall 11b in the enclosure 11 defines a discharge outlet 16 therethrough. A rotary valve 20 is positioned over the feed inlet 15 and a rotary valve 21 is situated at the discharge outlet 16. Rotary valve 20 and 21 are sealingly engaged at their respective openings in the enclosure 11 to assure the particulate lead laden atmosphere contained within the furnace chamber 14 defined by the enclosure does not escape, it being a desired objective to minimize air pollution as well as to avoid heat loss within the furnace chamber 14.

In a departure from the prior art furnaces, a plurality of tubes 25a-25f are horizontally mounted within the furnace chamber 14. The tubes are stacked in a vertical arrangement, as shown in FIG. 1. The first tube 25a has an opening 26 that opens into the feed inlet 15 and the last tube 25f has an opening 27 that opens into the discharge outlet 16. Rotary valves 20 and 21 include a portion sealingly engaged over the openings 26 and 27, respectively, in order to prevent any leaking of the atmosphere existing within the vertical array of tubes 25a-25f. In the production of red lead or other oxides of lead, the atmosphere within the tubes 25a 25f is typically ambient air fed through the discharge outlet 16 into the furnace chamber. The atmosphere may also be pure oxygen or oxygen enriched air maintained under pressure within the tubes. The use of the rotary valves 20 and 21 at the feed inlet 15 and discharge outlet 16 insures that the atmosphere within the furnace chamber of air or oxygen, whether pressurized or not, is maintained throughout the conversion process. The rotary valves 20 and 21 are indicated in the preferred embodiment to allow for continuous feed of particulate material while maintaining an airlock at the feed inlet and discharge outlet. It is understood that other devices having similar capabilities may be substituted for the rotary valves.

Each tube in the array of tubes 25a-25f communicates serially with an adjacent tube to form a continuous flow path between feed inlet 15 and discharge outlet 16. In the preferred embodiment, vertical chutes 28a-28e interconnect adjacent tubes. For instance, chute 28a connects one end of tube 25a with one end of tube 25b, and vertical chute 28b connects the other en of tube 25b with one end of tube 25c. In the preferred embodiment, the tubes 25a-25f are interconnected to form a serpentine path between the feed inlet 15 and the discharge outlet 16.

In one aspect of the invention, a gas containing oxygen is injected into the array of tubes 25a-25f through the discharge outlet 16 and opening 27 in the bottom tube 25f. The gas travels upwards in the vertical array of tubes toward the feed inlet 15. As will be discussed herein, the gas within the array of tubes 25a-25f is heated in successive tubes and the hot gas naturally rises within the array of tubes. Likewise, gas in the furnace chamber 14 outside the tubes is also heated and rises by convection to the top of the chamber.

Rotatably disposed within each of the tubes 25a-25f is a corresponding conveyor assembly 30a-30f. The conveyor assembly 30a includes an axle 31 spanning the enclosure 11 and extending through openings 17L and 17R in enclosure 11. The axle 31 is rotatably mounted on bearings 32L and 32R. The bearing 3ZL and 32R are Sealingly engaged on enclosure 11 about the respective openings 17L and 17R by way of packing glands 33L and 33R, respectively. In the preferred embodiment, a number of paddles 35 are mounted on axle 31 in a conventional manner. The paddles 35 are arranged in a staggered pattern along the length of axle 31 so that particulate material introduced in tube 25a through the feed inlet 15 is conveyed along the entire length of the tube 25a toward the vertical chute 28a as the axle 31 is rotated in an appropriate direction. The paddles 35 of the preferred embodiment are typical of paddles known in the rake furnace art that are designed to agitate the particulate material as the material is being conveyed along the length of the tube 25a. Agitating, or tumbling the particulate material is essential to achieving maximum oxidation of all surfaces of the particulate material.

In the preferred embodiment, the paddles 35 are skewed or pitched relative to the axle 31 to facilitate conveying the particulate material along the tubes. The paddles may be adjustable to vary the pitch and thereby vary the rate at which the particulate material is conveyed. It is understood that the remaining conveyor assemblies 30b-30f are similar to the conveyor assembly 30a and include the axle 31, bearings 32, packing glands 33 and paddles 35 just described. In the preferred embodiment, the tubes and paddles are constructed from stainless steel capable of withstanding temperatures in excess of 1250° F.

Alternatively, the conveyor assemblies 30a-30f may instead include a screw auger in lieu of the axle and paddle assembly described. The blades of the auger could be equipped with agitation elements to stir the particulate matter for full exposure and conversion. The screw auger in successive tubes may have a different blade pitch to vary the rate at which the particulate material is conveyed along the length of the tubes relative to other tubes.

In the preferred embodiment of the present invention, the conveyor assemblies 30a-30f along with the rotary valves 20 and 21, are driven by a drive assembly 40. The drive assembly 40 includes a motor 41 that has an output coupled with a variable speed drive 42. The variable speed drive 42 provides rotary motion to drive shaft 43. The drive shaft 43 is split into shaft portions 43a and 43b by a coupling 44. The coupling 44 is provided to disconnect the two shaft portions 43a and 43b, thereby halting the rotation of the shaft portion 43b that provides rotary power to the conveyor assemblies 30a-30f and the rotary valves 20 and 21. The shaft portion 43b is directly coupled to the rotary valve 21 to drive the rotary element of that valve.

At the lowermost tube 25f, a chain and sprocket apparatus 45g rotationally interconnects shaft portion 43b with the axle of conveyor assembly 30f. Thus, rotation of the shaft portion 43b causes the chain and sprocket assembly 45g to rotate, which in turn causes the axle of the conveyor assembly 30f to rotate. The rotation of the conveyor assembly 30f is transmitted to conveyor assembly 30e by way of a gear and sprocket combination 45f. The rotational motion imparted by the motor 41 and variable speed drive 42 is transmitted serially to each of the conveyor assemblies 30a-30f by way of the gear and sprocket combinations 45b-45g. A gear and sprocket combination 45a is connected between axle 31 of conveyor assembly 30a and shaft 22 which drives the rotary element of rotary valve 20.

The details of one chain an sprocket apparatus 45b are illustrated in FIG. 2. The apparatus 45b includes a sprocket 46 attached to the conveyor assembly 30a and a sprocket 47 engaged on conveyor assembly 30b. A chain 48 spans between the sprockets 46 and 47 to transmit rotation from the conveyor assembly 30b to the conveyor assembly 30a. As shown in FIG. 2, the sprocket 46 is larger than the sprocket 47 and includes more sprocket teeth. Thus, in accordance with standard gear principles, the rotation of sprocket 46, and the conveyor assembly 30a will be slower than the rotational speed of the sprocket 47 and conveyor assembly 30b. as determined by the ratio of the size of sprocket 47 over the size of sprocket 46. It is understood that in each gear and sprocket combinations 45a-45g, the relative speed of rotation between the rotationally coupled shafts or axles can be determined in a similar manner. Consequently, the rotational speed of the conveyor apparatus in successive tubes can be modified or controlled. It may, for example, be desirable to have the particulate matter travel slower through one tube than through another. For instance, where the first tube 25a is used to preheat feed material entering the furnace 10, it may be desirable for the feed material to move more slowly along the length of the tube 25a than in the remaining tubes of the array, in order to insure that the feed material is adequately preheated.

In the preferred embodiment, the rotation of every rotating element of the red lead furnace 10 is interrelated and controllable by the variable speed drive 42 and the coupling 44. The use of this rotationally interconnected system allows for the conversion of particulate feed material in a continuous, rather than batch, process. Feed material introduced into rotary valve 20 at feed inlet 15 is continuously conveyed by the paddles 35 in each conveyor assembly 30a-30f along each successive tube 25a-25f until the material reaches the discharge outlet 16 and the outlet rotary valve 21. The speed with which the feed material moves between the feed inlet 15 and the discharge outlet 16 is controlled by the variable speed drive 42, which can be varied by the operator depending upon the particular oxidation reaction desired. The travel speed of feed material also depends upon the relationship between sprocket sizes in the chain and sprocket apparatus 45a-45g.

Returning to FIG. 1, another novel aspect of the present invention is found in the manner in which the particulate feed material is heated within the furnace 10. In the preferred embodiment, the tube 25a, for example, is surrounded by electric heat tapes or straps 29. The heat tapes 29 are connected to a source of electrical energy E by an electrical connection or wire W or other suitable means. The heat tapes 29 can be situated along the entire length of tube 25a or on some portion of the length, depending upon the temperature to be achieved in the tube. When the electric heat tapes are energized, the heat tapes 2 heat the tube 25a which in turn heats the gas and particulate feed material within the tube 25a. Any or all of the remaining tubes 25b-25f may also include the heat tapes 29 affixed to the outer surface of the tube. In this manner, the temperature in each of the tubes 25a-25f in the tube array can be easily determined and controlled by the heating capacity of the electric heat tapes 29 associated with each tube. In addition, if the heat tapes 29 associated with each tube 25a-25f include a separate electrical connection, such as wire W, to the energy source E, the heat apes can be separately energized or de-energized for a given tube, depending upon the temperature profile desired along the vertical array of tubes. While electric heat tapes have been described, other heating elements such as a heating coil may also be engaged about the tubes to provide electric heating of the tubes and the particulate feed material within.

The furnace 10 of the present invention is of modular construction. The containment 11 is separated into two halves, one of which is shown in FIGS. 1 and 3. The containment half 11', shown in FIG. 3, is removably mated with a mirror image half of the containment 11. The two halves of containment 11 are mated so as to form an airtight seal in order to preserve the atmosphere within the furnace chamber 14. With this modular construction, the individual tubes 25a-25f and conveyor assemblies 30a-30f can be inserted within the containment half 11', so that the axles 31 of each conveyor assembly extend through the opening 17L and 17R. Once each of the tubes and conveyor assemblies are mounted within their respective openings in the containment half 11', the rotary valves 0 and 21 may be mated with the respective openings 26 and 27 in tubes 25a and 25f, and sealed within the feed inlet 15 and discharge outlet 16, respectively. When the internal components of the furnace 10 have been installed, the remaining half of the containment 11 can be attached to the containment half 11' to form the oven chamber 14. The bearings 32L and 32R and packing glands 33L and 33R, along with the chain and sprocket apparatus 45a-45g corresponding to each tube can then be attached.

This modular construction makes the furnace 10 of the present invention easy to fabricate, install and maintain. Moreover, the entire furnace 10 can be assembled by unskilled laborers. The use of an array of serially connected tubes, within which the particulate feed material is heated and converted, eliminates some of the concern about maintaining an airtight furnace chamber 14 when the halves of the containment 11 are connected.

The unique features of the furnace 10 of the present invention provide a novel means for converting lead and oxides of lead into various other oxides of lead. With this invention it is possible to convert lead to leady-oxide, lead to litharge, litharge to red lead, and leady oxide to red lead using the same furnace 10. The versatility of the tubular construction, the electric heat tapes, and the variable speed drive assembly 40 of the furnace 10, allows the furnace operator to control the temperatures in the tubes as well as the rate of travel of the feed material through the tubes. The degree and type of oxidation reaction can then be readily controlled. For instance, if particulate lead is fed into rotary valve 20 through feed inlet 15 into the array of tubes, the temperature within some or all of the tubes 25a-25f can be maintained at a temperature sufficient to convert the lead to litharge, typically around 1250° F. The rate of travel of the particulate lead through the tubes 25a-25f can be controlled by the speed of rotation of the axle 31 and paddles 35 of the conveyor assemblies 30a-30f. Controlling the speed of the conveyor apparatus 30a-30f controls the amount of time the particulate lead is exposed to the temperatures within the tubes 25a-25f, which can be calibrated to insure optimum conversion of the lead to litharge.

In a similar fashion, the feed material may be litharge to be converted to red lead. In this instance, the particulate litharge is exposed to a lower temperature than is required for the formation of litharge from particulate lead, typically about 850° F. Again, the speed with which the particulate litharge is conveyed through the tubes 25a-25f can be controlled to insure complete conversion of the litharge to red lead, and to insure that the particulate material is not exposed to too much heat.

The furnace 10 of the present invention is also readily adapted for converting leady oxide, with a free metal lead content of between 5% and 60%, to red lead. Leady-oxide fed into rotary valve 20 at feed inlet 15 is preheated in tube 25a to a temperature at which the leady oxide will convert to litharge. In the preferred method, the leady-oxide comprises 75% litharge and 25% particulate lead, to be converted into 100% litharge. This conversion from leady-oxide to litharge is an exothermic reaction. The particulate leady oxide is preheated within the first tube 25a to a temperature of about 1250° F., which is sufficient to initiate the exothermic reaction. The exothermic reaction continues until 111 of the leady oxide has been converted into litharge.

In the preferred method of the using the furnace 10 of the present invention, the tubes 25b and 25c are maintained by the electric heat tapes 29 at the temperature of the first tube 25a to sustain the exothermic reaction. The speed of the conveying apparatus 30a-30c are calibrated so that the particulate leady-oxide is fully converted to litharge by the time the particulate material reaches the vertical chute 28c at the end of the third tube 25c. The exothermic reaction continues along the entire lengths of tubes 25b and 25c.

In a novel aspect of the present invention, the vertical arrangement of the tubes 25a-25f allows the heat generated by the exothermic reaction in tubes 25b and 25c to pass by convection upward to the first tube 25a. This additional convective heat assists in preheating the tube 25a, which reduces the energy load requirements for the electric heat tapes 29 about tube 25a. Thus, the energy requirements for preheating the leady-oxide are reduced by taking advantage of the natural heat generated in the exothermic conversion from leady oxide to litharge.

Once the particulate lady-oxide has been fully converted to litharge at the end of tube 25c, the temperature in the remaining tubes is reduced to the optimum 850° F. temperature for converting litharge to red lead. The particulate litharge entering tube 30b is conveyed along tubes 30d-30f toward the discharge rotary valve 21 at a rate established by the desired composition of the discharged product. For instance, the discharged product leaving rotary valve 21 can consist of 15% to 99% red lead, with the remainder of the discharged product being litharge or other oxides of lead. The amount of conversion of the particulate litharge is determined by the rate at which the particulate material is conveyed along the tubes 30d-30f, which naturally varies the amount of time the litharge is exposed to the conversion temperature of 850° F.

The variability of the furnace 10 of the present invention also provides a means for controlling the exothermic reaction that occurs within tubes 25b and 25c during the conversion of the leady oxide into litharge. It is well known that if the exothermic reaction is let unchecked it will continue until the heat buildup within the furnace chamber 14 is excessive. Thus, it is important to control the rate of the exothermic reaction in order to control the temperature buildup within the furnace chamber. The rate of the exothermic reaction can be controlled by controlling the rate that material is fed into the reaction. The feed rate of the material can be controlled at the rotary valve 20 which controls the speed and amount of particulate material that enters the first tube 25a. The feed rate of the particulate material to the exothermic reaction can also be controlled by the speed of rotation of the axle 31 and paddles 35 of the conveyor apparatus 30a. If the amount of particulate material is decreased, the rate of the exothermic reaction will also decrease. Thus, the amount of material heated to the reaction temperature and the speed with which the material is fed to the reaction determines the rate of the exothermic reaction, thereby controlling the temperature within the tubes 25a-25c.

One benefit of the furnace 10 of the present invention is that it can operate well with a gaseous atmosphere of either air or pure oxygen atmosphere within the tubes 25a-25f. It can also operate well whether the atmosphere is pressurized or non pressurized within the tubes. In the preferred embodiment, the gas is introduced at the discharge outlet 16 so that the gas flows upwards within the tubes 25a-25f, assisted by natural convection as the gas is heated within the furnace chamber 14. In another version of the present invention, air can be injected into an individual tube as required to enhance the conversion process occurring within that tube.

The volume within the tubes 25a-25f in which the conversion processes are occurring is less than the volume within the typical batch furnace of the prior art. Thus, less gas is being used and less energy is required to maintain the necessary atmosphere within the tubes 25a-25f as opposed to the batch furnaces of the prior art. Since less gas is being used, less gas is being discharged into the bag house, which necessarily means fewer lead particles are also being discharged to the bag house. Since the volumetric requirements of the bag house may be reduced, the energy and equipment necessary for environmental purposes is also reduced.

The furnace 10 of the present invention replaces the typical fossil fuel burner of the prior art with more efficient electric heat tapes or oils extending around the tubes 25a-25f. Thus, less energy is required to heat the gas and feed material within the tubes 25a-25f. The use of the electric heat tapes 29 around individual tubes also allows for flexibility in heating along the process cycle that has been heretofore unknown in the prior art. The use of the paddles 35 on the conveying apparatus 30a-30f allows the oxidation conversion process to be continuous, as opposed to the batch modes of most prior art furnaces. Consequently, the production rate of the various oxides of lead can be increased from the batch furnaces of the prior art, all at a lower energy requirement.

In an alternative embodiment f the present invention, a furnace 50, as shown in FIG. 4, includes an enclosure 51 similar to the enclosure 11. The enclosure 51 includes a feed inlet 52 and a discharge outlet 53, each having a rotary valve sealingly engaged thereon as in the first embodiment. In a variation from the first embodiment, the furnace 51 includes a single tube 54 within which a single conveyor assembly 56 is disposed. The conveyor assembly 56, as well as the rotary valves, are driven by the chain nd sprocket drive assembly 55, which is similar to the drive assembly 40 of the former embodiment.

The furnace 50 of this second embodiment includes electric heat tapes mounted on the exterior of the tube 54. In order to achieve the temperature variation achieved by the furnace 10 of the first embodiment, two groups of heat tapes are affixed to the tube 54. The first group of heat tapes 57 is mounted along a first length of the tube. Similar to the heat tapes in the uppermost tubes of the first embodiment, the first group 57 are adapted to produce a temperature of about 1250° F. in the first length of the tube 57. The second group of heat tapes 58 are adapted to generate a lower temperature in the remaining portion of the tube 54 of about 850° F. With the two groups 57 and 58 of heat tapes, a single tube furnace may be adapted to produce varying percentages of red lead from a particulate feed mixture of leady oxide. In order to modify the rate at which the feed mixture is exposed to the temperature generated by each group of heat tapes, the pitch of the paddles of the conveyor assembly can be varied in the manner described above.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A furnace for producing oxides of lead from a particulate feed material containing lead, comprising:

a refractory lined enclosure defining a furnace chamber, a feed inlet for feeding particulate feed material into said chamber, and a discharge outlet for discharging said feed material outside said chamber;

a tube within said chamber, said tube having a first end and a second end, said first end opening at said feed inlet and said second end opening at said discharge outlet, said tube further having sealing means for sealing the interior of said tubes in an airtight fashion from communication with said furnace;

feeding means, associated with said feed inlet, for continuously feeding feed material into said first tube through said feed inlet;

conveying means for continuously conveying said feed material along said tube from said feed inlet to said discharge outlet; and electric heating means, associated with said tube for heating said feed material within said tube while said feed material is being conveyed along said tube.

2. The furnace for producing oxides of lead according to claim 1, wherein said feeding means includes:

a first rotary valve in sealing engagement with said tube at said feed inlet; and a second rotary valve in sealing engagement with said tube at said discharge outlet, whereby a generally airtight seal is formed in said tube between said first rotary valve and said second rotary valve.

3. The furnace for producing oxides of lead according to claim 1, wherein said conveying means includes:

an axle;

means for rotatably mounting said axle within said tube;

a plurality of paddles affixed to said axle and arranged in a pattern adapted to convey the particulate feed material along said tube as said axle is rotated; and means for rotating said axle.

4. The furnace for producing oxides of lead according to claim 3, wherein:

said paddles are affixed to said axle at a pitch angle; and said conveying means includes means for varying said pitch angle to vary the rate at which the particulate feed material is conveyed along said tube.

5. The furnace for producing oxides of lead according to claim 3, wherein:

said means for rotating said axle includes:

means for generating rotary motion at a drive shaft;

means for varying the rotational speed of said drive shaft; and means for rotationally coupling said drive shaft to said axle; and said feeding means includes:

a first rotary valve in sealing engagement with said tube at said feed inlet;

a second rotary valve in sealing engagement with sad tube at said discharge outlet, whereby a generally airtight seal is formed in said tube between said first rotary valve and said second rotary valve; and means for rotationally coupling said drive shaft to said first rotary valve an said second rotary valve.

6. The furnace for producing oxides of lead according to claim 1, wherein said electric heating means includes:

a first group of electric heating elements in heat exchange relationship with said tube along a first portion of the length of said tube; and a source of electrical energy electrically coupled to said first group of electric heating elements; wherein said first group of electric heating elements are adapted to produce a first temperature within said tube when said first group is energized by said source of electrical energy.

7. The furnace for producing oxides of lead according to claim 6, wherein said electric heating means further includes:

a second group of electric heating elements in heat exchange relationship with said tube along a second portion of the length of said tube; and a source of electrical energy electrically coupled to said second group of electric heating elements;

wherein said second group of electric heating elements is adapted to produce a second temperature lower than said first temperature within said tube when said second group is energized by said source of electrical energy.

8. The furnace for producing oxides of lead according to claim 7, wherein:

said first temperature is sufficient to convert leady oxide to litharge; and said second temperature is sufficient to convert litharge to red lead.

9. A furnace for producing oxides of lead from a particulate feed material containing lead, comprising:

a refractory lined enclosure defining a furnace chamber, a feed inlet for feeding particulate feed material into said chamber, and a discharge outlet for discharging said feed material outside said chamber;

a plurality of generally horizontally disposed tubes stacked vertically within said chamber, the uppermost one of said tubes having a first end with an opening at said feed inlet, and the lowermost one of said tubes having a second end with an opening at said discharge outlet, said plurality of tubes arranged in serial communication with one another and including sealing means for sealing the interior of said tubes in an airtight fashion from communication with said furnace;

feeding means, associated with said feed inlet, for continuously feeding feed material into said first tube through said feed inlet;

conveying means for continuously conveying said feed material serially through each of said plurality of tubes from said feed inlet to said discharge outlet; and electric heating means, associated with at least one of said plurality of tubes for heating the feed material as the feed material is being conveyed along said plurality of tubes.

10. The furnace for producing oxides of lead according to claim 9, wherein said feeding means includes:

a first rotary valve in sealing engagement with said uppermost tube at said feed inlet; and a second rotary valve in sealing engagement with said lowermost tube at said discharge outlet, whereby a generally airtight seal is formed in said plurality of tubes between said first rotary valve and said second rotary valve.

11. The furnace for producing oxides of lead according to claim 9, wherein said conveying means includes:

a plurality of rotary conveyors each associated with a corresponding one of said plurality of tubes, each of said plurality of rotary conveyors having:
an axle;
means for rotatably mounting said axle within said corresponding tube;
a plurality of paddles affixed to said axle and arranged in a pattern adapted to convey the particulate feed material along said corresponding tube as said axle is rotated; and
drive means for rotating said axles of said plurality of rotary conveyors at different speeds relative to one another.

12. The furnace for producing oxides of lead according to claim 11, wherein said drive means includes:
a drive shaft;
means for generating rotary motion in said drive shaft;
means for varying the rotational speed of said drive shaft; and
coupling means for rotationally coupling said drive shaft to said axle of each of said plurality of rotary conveyors.

13. The furnace for producing oxides of lead according to claim 12, wherein said coupling means includes:
a first sprocket mounted at one end of each said axle of each of said plurality of rotary conveyors;
a second sprocket mounted at the other end of each said axle of each of said plurality of rotary conveyors;
a chain engaged between alternating pairs of said first sprockets and said second sprockets to simultaneously rotationally couple said plurality of rotary conveyors.

14. The furnace for producing oxides of lead according to claim 12, wherein said feeding means includes:
a first rotary valve in sealing engagement with said uppermost tube at said first opening; and
a second rotary valve sealingly engaged over said second opening, whereby a generally airtight seal is formed in said plurality of tubes between said first rotary valve and said second rotary valve; and
second means for rotationally coupling said drive shaft to said first rotary valve and said second rotary valve.

15. The furnace for producing oxides of lead according to claim 11, wherein:
each of said plurality of paddles includes means for agitating the particulate feed material as the feed material is conveyed along said corresponding tube.

16. The furnace for producing oxides of lead according to claim 15, wherein:
said paddles are affixed to said axle at a pitch angle; and
said conveying means includes means for varying said pitch angle to vary the rate at which the particulate feed material is conveyed along said tube.

17. The furnace for producing oxides of lead according to claim 9, wherein said electric heating means includes:
a first group of electric heating elements in heat exchange relationship with a corresponding one of a first group of said plurality of tubes; and
a source of electrical energy electrically coupled to said first group of electric heating elements; wherein
said first group of electric heating elements is adapted to produce a first temperature within said first group of tubes when said first group of electric heating elements is energized by said source of electrical energy.

18. The furnace for producing oxides of lead according to claim 17, wherein said electric heating means further includes:
a second group of electric heating elements in heat exchange relationship with a corresponding one of a second group of said tubes; and
mans for electrically coupling said second group of electric heating elements to said source of electrical energy; wherein
said second group of electric heating elements is adapted to produce a second temperature lower than said first temperature within said second group of tubes when said second group of heating elements is energized by said source of electrical energy.

19. The furnace for producing oxides of lead according to claim 18, wherein:
said first temperature is sufficient to convert leady-oxide to litharge; and
said second temperature is sufficient to convert litharge to red lead.

20. The furnace for producing oxides of lead according to claim 9, wherein:
said furnace is of modular construction with said enclosure having a first half and a second half, said first half and second half being adapted to be removably sealingly engaged with each other; and
at least said first half including means for removably mounting said plurality of tubes within said first half.

* * * * *

UNITED STATES PATENT AND TRADEMARK OFFICE
CERTIFICATE OF CORRECTION

PATENT NO. : 4,912,301

DATED : Mar. 27, 1990

INVENTOR(S) : B. F. McKinney, et al.

It is certified that error appears in the above-identified patent and that said Letters Patent is hereby corrected as shown below:

In column 3, line 39, please change "32L" to --32L--.
In column 3, line 40, please change "Sealingly" to --sealingly--.
In column 4, line 51, please change "30b." to --30b,--.
In column 5, line 27, please change "2" to --29--.
In column 5, line 38, please change "heat apes" to --heat tapes--.
In column 5, line 60, please change "0" to --20--.
In column 12, line 28, please change "mans" to --means--.

Signed and Sealed this

Nineteenth Day of March, 1991

Attest:

HARRY F. MANBECK, JR.

*Attesting Officer*

*Commissioner of Patents and Trademarks*